(12) United States Patent
Haff et al.

(10) Patent No.: US 8,072,905 B2
(45) Date of Patent: Dec. 6, 2011

(54) INTELLIGENT INTERACTION BETWEEN DEVICES IN A LOCAL NETWORK

(75) Inventors: Olle Haff, Linkoping (SE); Max Cahne, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 302 days.

(21) Appl. No.: 12/025,155

(22) Filed: Feb. 4, 2008

(65) Prior Publication Data

US 2009/0197524 A1  Aug. 6, 2009

(51) Int. Cl.
*H04L 12/28* (2006.01)

(52) U.S. Cl. .......................... 370/254; 370/278; 370/328

(58) Field of Classification Search .................. 370/254, 370/278, 328
See application file for complete search history.

(56) References Cited

U.S. PATENT DOCUMENTS

| | | |
|---|---|---|
| 6,694,143 B1 * | 2/2004 | Beamish et al. ............ 455/456.1 |
| 7,184,522 B2 * | 2/2007 | Brunelle et al. ............ 379/88.17 |
| 2003/0133551 A1 * | 7/2003 | Kahn ........................ 379/102.03 |
| 2005/0071439 A1 * | 3/2005 | Bookman et al. ............. 709/217 |
| 2007/0032225 A1 * | 2/2007 | Konicek et al. ............... 455/417 |
| 2007/0049197 A1 | 3/2007 | Klein |
| 2007/0140198 A1 * | 6/2007 | Fujita ............................. 370/338 |
| 2009/0143056 A1 * | 6/2009 | Tang et al. ..................... 455/418 |
| 2009/0164547 A1 * | 6/2009 | Ch'ng et al. .................. 709/201 |
| 2009/0169023 A1 * | 7/2009 | Wang .............................. 381/57 |

FOREIGN PATENT DOCUMENTS

| | | |
|---|---|---|
| EP | 1 775 657 A1 | 4/2007 |
| EP | 1 830 558 A1 | 9/2007 |
| FR | 2 898 719 A1 | 9/2007 |
| WO | WO 2005/078676 A2 | 8/2005 |
| WO | WO 2006/084841 A1 | 8/2006 |
| WO | WO 2007/125512 A2 | 11/2007 |

OTHER PUBLICATIONS

Notification of Transmittal of the International Search Report and the Written Opinion of the International Searching Authority, or the Declaration, corresponding to PCT/IB2008/053083, mailed Nov. 5, 2009, 16 pages.

* cited by examiner

*Primary Examiner* — Jason Mattis

(74) *Attorney, Agent, or Firm* — Snyder, Clark, Lesch & Chung, LLP

(57) ABSTRACT

A device may include a network interface through which the device communicates with a media device in a local network. The device may include a processor to detect whether the device receives a call, determine whether the device is within a predetermined range of the media device based on communication between the device and the media device, and send a message to the media device via the network interface to request the media device to reduce an audio output of the media device when the device is within the predetermined range of the media device and when the device has received the call.

20 Claims, 8 Drawing Sheets

Fig. 2A      Fig. 2B

INTELLIGENT INTERACTION BETWEEN DEVICES IN A LOCAL NETWORK

BACKGROUND

Computers, communication devices, and/or media devices (e.g., a television, a receiver, etc.) may interact with one another in a local media network. The devices may share multimedia content in the local media network.

SUMMARY

According to one aspect, a method may include detecting a change in video or audio output of a mobile device, obtaining a physical location of the mobile device and a physical location of a media device, determining a distance between the mobile device and the media device based on the physical locations of the mobile device and the media device, determining whether the distance is within a predetermined range, and modifying output of the media device when the distance is within the predetermined range.

Additionally, modifying output of the media device may include at least one of sending a command from the mobile device to the media device to fade out or reduce an audio output of the media device, sending a command from the mobile device to the media device to pause the output of the media device, sending a command from the mobile device to the media device to buffer the output of the media device, or sending a command from the mobile device to the media device to store information that indicates what part of content in the output of the media device has been played.

Additionally, sending a command to the media device may include sending a Simple Object Access Protocol command.

Additionally, the method may further include detecting a change in the distance between the mobile device and the media device, determining whether the mobile device is within the predetermined range of the media device, and modifying the output of the media device when the mobile device is not within the predetermined range.

Additionally, detecting a change in video or audio output of a mobile device may include one of detecting an incoming phone call, detecting a termination of a call, or detecting a playing of an audio file, a video file, an audio disk, or a video disk.

Additionally, the method may further include discovering the media device in a local media network in accordance with Universal Plug and Play protocol.

Additionally, the method may further include obtaining a service description and a device description of the media device via a local media network.

Additionally, obtaining a physical location of the mobile device and a physical location of the media device may include requesting the media device to provide the physical location of the media device.

Additionally, modifying output includes at least one of restoring an audio output of the media device to a level prior to the detected change in the output of the mobile device, causing the media device to resume the output of the media device, causing the media device to play buffered output of the media device, or causing the media device to play unplayed part of content based on information that has been stored and that indicates what part of content in the output of the media device has been played.

Additionally, the method may further include receiving from a user a desired level of volume to which the audio output is to be set when a change is detected in the audio output of the mobile device.

Additionally, the method may further include exchanging multimedia content with the media device in accordance with Digital Living Network Alliance protocols.

According to another aspect, a device may include a network interface through which the device communicates with a media device in a local network. The device may further include a processor to detect whether the device receives a call, determine whether the device is within a predetermined range of the media device based on communication between the device and the media device, and send a message to the media device via the network interface to request the media device to reduce an audio output of the media device when the device is within the predetermined range of the media device and when the device has received the call.

Additionally, the device may include a universal plug and play (UPnP) compliant device.

Additionally, the local network may include a network that is compliant with Digital Living Network Alliance guidelines.

Additionally, the media device may include one of a speaker, a television, a personal computer, a laptop, a receiver, a digital video disk player, or a game playing device.

Additionally, the processor may be further configured to detect the media device via a discovery protocol.

Additionally, the message may include a Simple Object Access Protocol message.

Additionally, the device may further include an accelerometer for determining a position of the device, or a Global Positioning System receiver for determining a position of the device.

Additionally, the processor may be further configured to receive user input for setting a desired level of volume for reducing the output of the media device when the media device is within the predetermined range, and receive user input indicating the predetermined range.

According to yet another aspect, a device may include means for detecting whether the device receives a call, means for discovering a media device in a local media network, means for sending a request for a physical location of the media device to the media device, means for determining whether the device is within a predetermined range of the media device based on a response from the media device, and means for sending a request to the media device to turn off audio output or reduce the audio output of the media device when the device moves into a predetermined range of the media device while the device is engaged in the call.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

In implementations described herein, a device (e.g., a portable phone) may establish a communication link with other devices in a local media network. In response to events at the device (e.g., the device receives an incoming call), the device may interact intelligently with other devices in the local media network (e.g., cause a pair of speakers in the local media network to decrease the volume).

Figure 1:
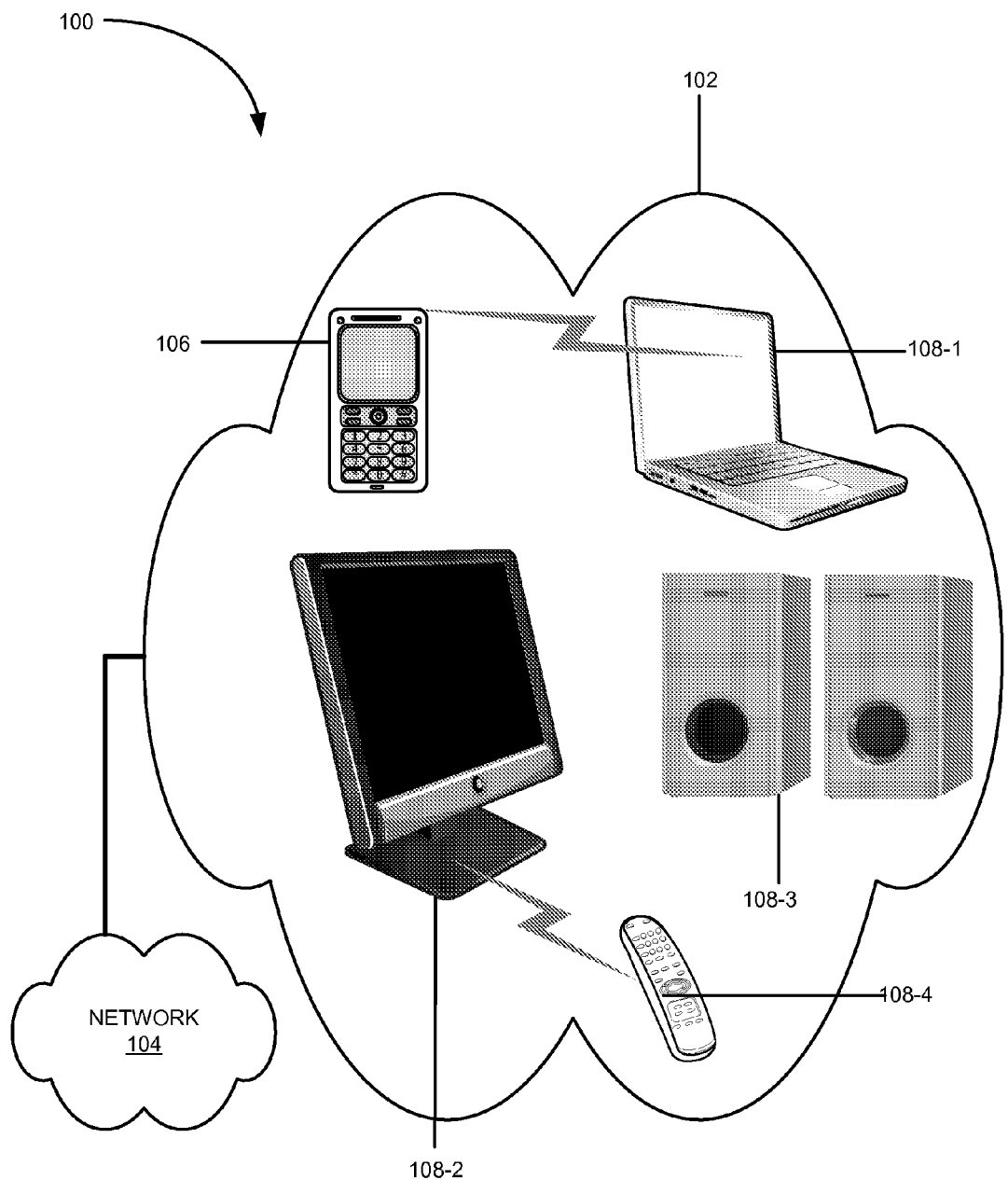
FIG. 1 is an exemplary network in which concepts described herein may be implemented.

FIG. 1 is an exemplary network 100 in which concepts described herein may be implemented. As shown, network 100 may include local media network 102 and network 104. Local media network 102 may include a local area network (LAN), a wireless local area network (WLAN), a scatter net (e.g., a collection of one or more wireless personal area networks (WPANs)), and/or other types of networks that are capable of conveying multimedia content and/or other types of information. Network 104 may include the Internet, an ad hoc network, a local area network (LAN), a wide area network (WAN), a metropolitan area network (MAN), a cellular network, a public switched telephone network (PSTN), an intranet, any other network, or a combination of networks. Local media network 102 may be connected to network 104 by devices such as a firewall, a gateway, etc. (not shown).

As further shown in FIG. 1, local media network 102 may include a mobile device 106 and media devices 108-1 through 108-4. Mobile device 106 may include, for example, a radio telephone or a mobile telephone with ultra wide band (UWB) communication capability, Wireless Fidelity (Wi-Fi), or Bluetooth capability; a game console or device; a global positioning system (GPS) receiver, a Cell positioning system (CPS) receiver, a Global Navigation Satellite System receiver, and/or a Beidou Navigation system receiver; a personal communications system (PCS) terminal that may combine a cellular radiotelephone with, data processing, facsimile, and/or data communications capabilities; a wearable computing devices (e.g., calculator-watch); an electronic notepad, a laptop, and/or a personal computer that communicate with wireless peripherals (e.g., a wireless keyboard, speakers, mouse, etc.); a personal digital assistant (PDA) that can include a telephone; or any other device that has the ability to or is adapted to communicate wirelessly and interact with other devices.

Each of media devices 108-1 through 108-4 (herein collectively referred to as media devices 108 and generically and individually as media device 108-x) may include a device such as a personal computer, a laptop computer, a digital video disk (DVD) player, a receiver, a speaker, a television, etc. Media device 108-x may exchange multimedia content with other devices and/or present the multimedia content to an audience. In addition, media device 108-x may discover other devices, control a delivery of multimedia content to the other devices, and/or control a presentation of the multimedia content to the audience.

In FIG. 1, depending on the implementation and/or configuration, local media network 102 may include additional, fewer, or different devices than the ones that are illustrated. For example, local media network 102 may include other mobile devices (e.g., a wireless mouse, a mobile telephone accessory, a gaming device, a wearable computing device (e.g., watch), a GPS receiver, a television, etc.) or media devices (e.g., a copier machine, a television, etc.) that can communicate with each other. In addition, each device in local media network 102 may include other nested devices. For example, a digital video disk (DVD) player may include a digital clock as well as a multimedia player. Furthermore, depending on particular manner in which a device is used, the device of one type (e.g., a mobile device 106) may function or operate as a device of another type (e.g., a media device 108-2). For example, media device 108-1 (e.g., a laptop) may operate as a mobile device.

Depending on the implementation, each device in network 102 may conform to one or more communication or network standards. For example, mobile device 106 and media device 108 may conform to the Digital Living Network Alliance (DLNA) guidelines. In such implementations, each of the devices in local media network 104 may provide a basic set of functionalities for controlling and/or interacting with one another, transporting multimedia content, and/or presenting the multimedia content.

Figure 2:
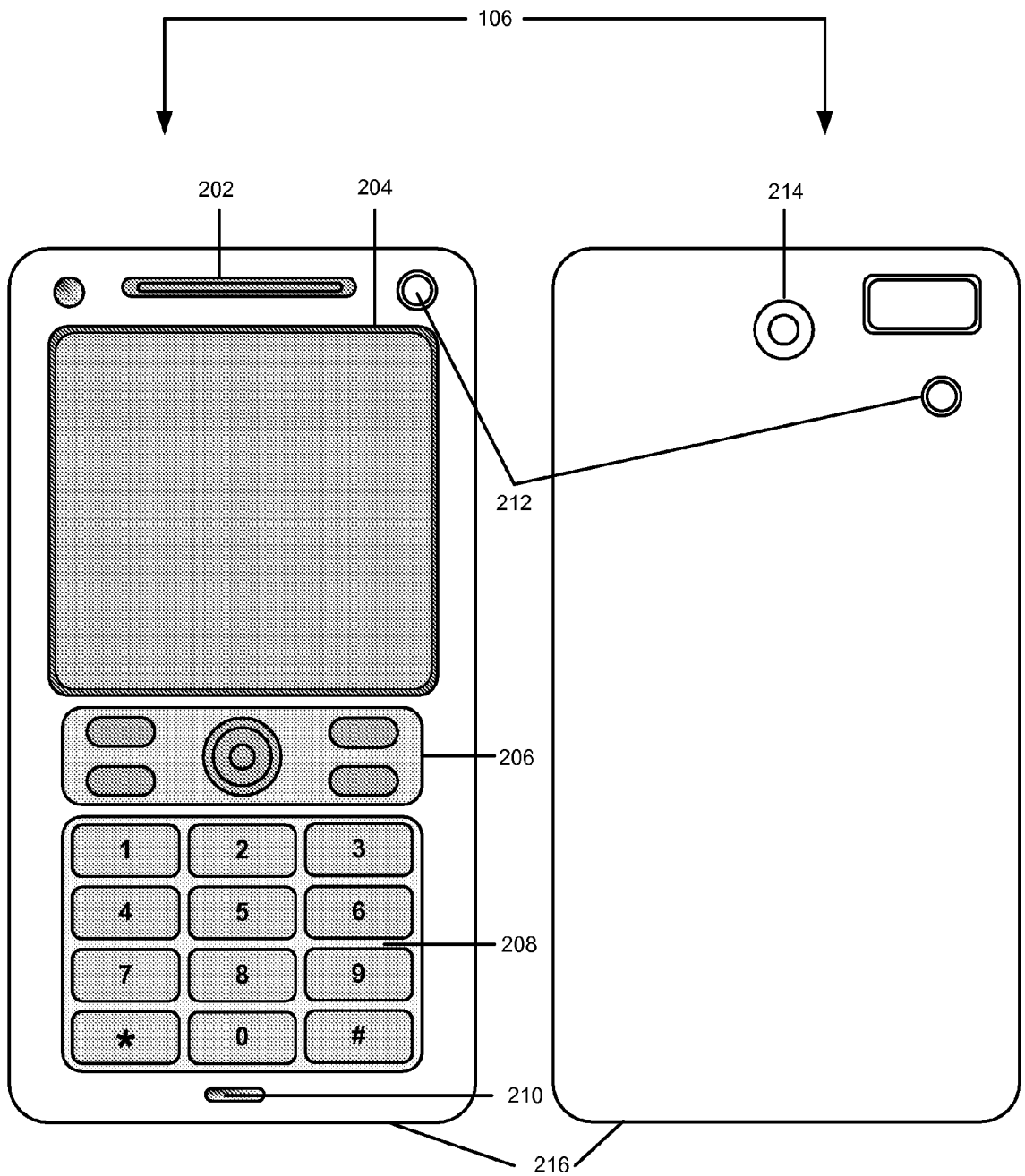
FIGS. 2A and 2B are front and rear views of an exemplary device of FIG. 1.

FIGS. 2A and 2B are front and rear views, respectively, of mobile device 106. In this implementation, mobile device 106 may take the form of a portable phone (e.g., a cell phone). As shown in FIGS. 2A and 2B, mobile device 106 may include a speaker 202, a display 204, control buttons 206, a keypad 208, a microphone 210, sensors 212, a lens assembly 214, and housing 216. Speaker 202 may provide audible information to a user of mobile device 106. Display 204 may provide visual information to the user, such as an image of a caller, text information, video images, or pictures. Control buttons 206 may permit the user to interact with mobile device 106 to cause mobile device 106 to perform one or more operations, such as placing or receiving a telephone call. Keypad 208 may include a standard telephone keypad. Microphone 210 may receive audible information from the user. Sensors 212 may collect and provide information (e.g., acoustic, infrared, etc.) that is used to aid the user in capturing images. Lens assembly 214 may include a device for manipulating light rays from a given or a selected range, so that images in the range can be captured in a desired manner. Housing 216 may provide a casing for components of mobile device 106 and may protect the components from outside elements.

Figure 3:
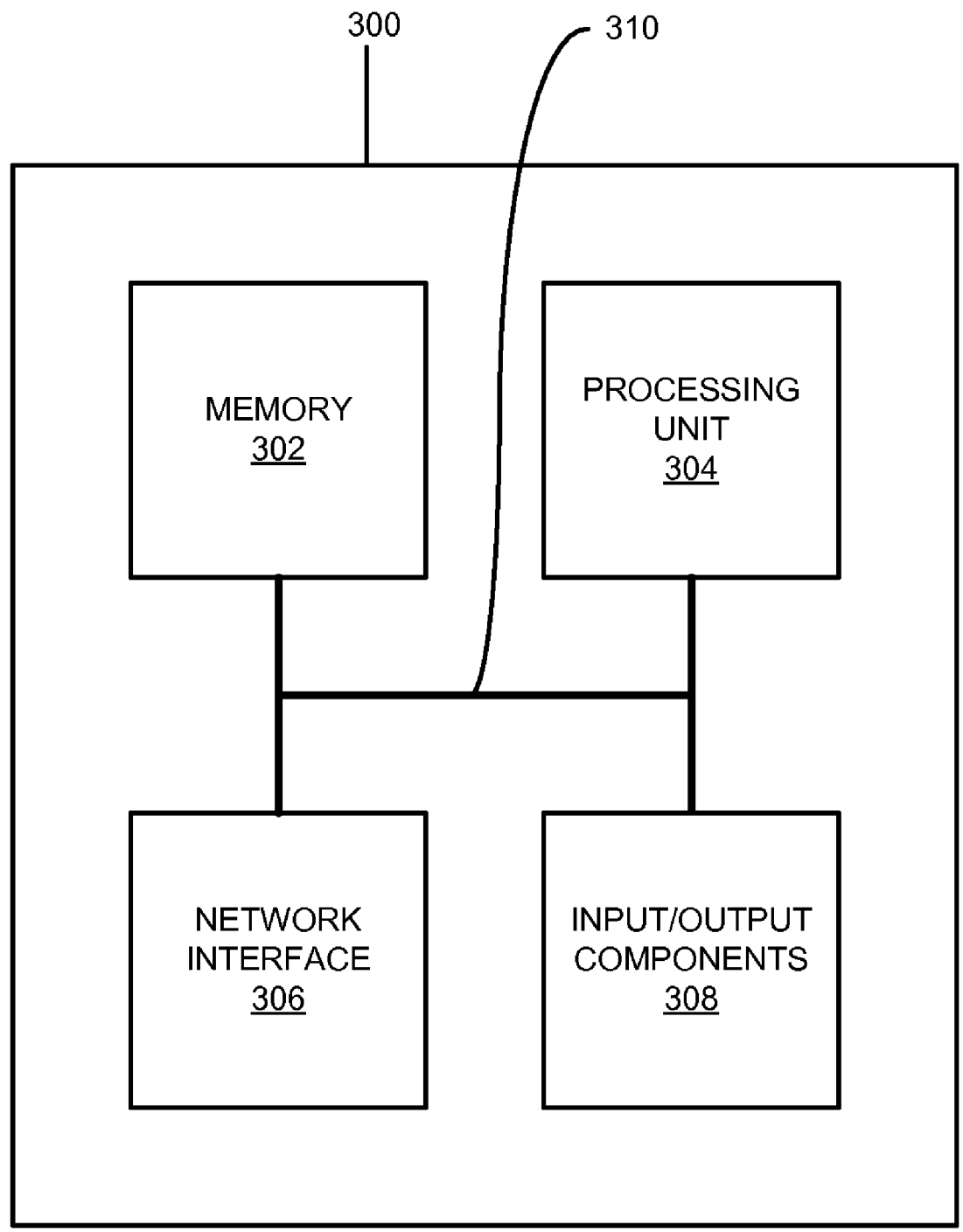
FIG. 3 is a block diagram of an exemplary device of FIG. 1.

FIG. 3 is a block diagram of exemplary components of a network device 300, which may represent mobile device 106 or media device 108-x. The term "component," as used herein, may refer to a hardware component, a software component, or a combination of the two. As shown, network device 300 may include a memory 302, processing unit 304, network interface 306, input/output components 308, and communication path(s) 310. In other implementations, network device 300 may include more, fewer, or different components.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, Compact Disk (CD) ROM, CD read/write (R/W) disc, and/or flash memory, as well as other types of storage devices. Processing unit 304 may include a processor, a microprocessor, an Application Specific Integrated Circuit (ASIC), a Field Programmable Gate Array (FPGA), and/or other processing logic capable of controlling network device 300.

Network interface 306 may include any transceiver-like mechanism that enables network device 300 to communicate with other devices and/or systems. For example, network interface 306 may include mechanisms for communicating via a network, such as the Internet, a terrestrial wireless network (e.g., wireless local area network (WLAN)), a satellite-based network, a WPAN, etc. Additionally or alternatively, network interface 306 may include a modem, an Ethernet interface to a LAN, and/or an interface/connection for connecting network device 300 to other devices (e.g., a Bluetooth interface). Further, network interface 306 may include one or more receivers, such as a Global Positioning System (GPS) receiver for determining its own physical location. Input/output components 308 may include a keypad (e.g., keypad 208 of FIG. 2), a button (e.g., control buttons 206), a mouse, a speaker (e.g., speaker 202), a microphone (e.g., microphone 210), a Digital Video Disk (DVD) writer, a DVD reader, Universal Serial Bus (USB) lines, and/or other types of devices for converting physical events or phenomena to and/or from digital signals that pertain to network device 300.

Depending on a particular implementation, input/output components 308 may include a display (e.g., display 204). The display may include a component that can display signals generated by network device 300 as images on a screen and/or that can accept inputs in the form of taps or touches on the screen. Examples of the display include a liquid crystal display (LCD), organic light-emitting diode (OLED) display, bistable display, and/or a touch screen.

Communication path 310 may provide an interface through which components of network device 300 can communicate with one another.

Figure 4:
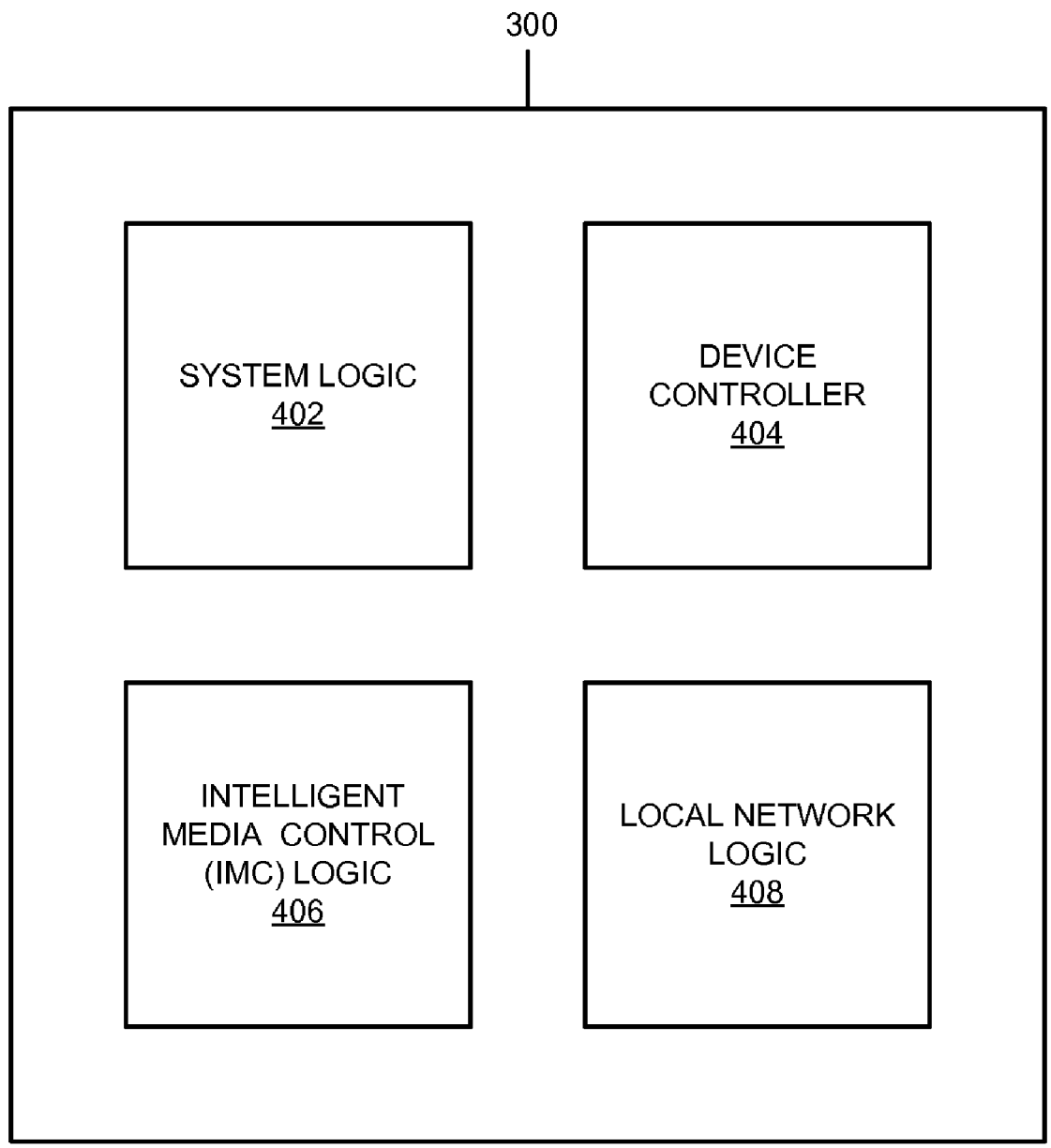
FIG. 4 is a functional block diagram of the exemplary device of FIG. 3

FIG. 4 is a functional block diagram of network device 300. As shown, device 300 may include system logic 402, a device controller 404, intelligent media control (IMC) logic 406, and local network logic 408. Depending on the particular implementation, network device 300 may include fewer, additional, or different types of functional blocks than those illustrated in FIG. 4.

System logic 402 may be included in processing unit 304 and/or memory 302, and may include hardware and/or software for performing various support functions for other components in FIG. 4 (e.g., local network logic 408, device controller 404, etc.) and for performing application functions. For example, system logic 402 may provide a Transmission Control Protocol (TCP)/Internet Protocol (IP) stack to support local network logic 408 on different devices. In another example, system logic 402 may provide a browser 408 to allow network device 300 to, for example, access the Internet.

Device controller 404 may include one or more components that supports specific functionalities of network device 300. For example, if network device 300 is implemented as a DVD player, device controller 404 may include a component to control the playing of multimedia content on a DVD, fast forwarding through the multimedia content, pausing a presentation of the multimedia content, etc.

IMC logic 406 may include components for a network device 300 (e.g., a mobile device 106) to intelligently interact with other devices. For example, using an external speaker may cause IMC logic 406 within media device 108-*x* that controls an entertainment speaker to send a command to the entertainment speaker. In response to the command, the entertainment speaker may lower the volume of its audio output.

Local network logic 408 may include components that support standard communication protocols for controlling devices in local media network 102 and for transporting multimedia content in local media network 102. Furthermore, the components of local network logic 408 may conform to one or more standards. For example, local network logic 408 may include components that support the DLNA guidelines, a High Definition Audio-video Network Alliance (HANA) specification, etc. In the descriptions that follow, however, components of network device 300 will be described in the context of interacting with other devices in accordance with the DLNA guidelines.

When local network logic 408 operates in accordance with the DLNA guidelines, local network logic 408 may provide a mechanism for responding to network service requests. For example, media player 108-*x* (e.g., a DVD player) may respond to requests that are issued over local media network communication channels in accordance with Universal Plug and Play (UPnP) protocol and/or Simple Object Access Protocol (SOAP).

In one implementation, local network logic 408 may respond to requests that include: a command to provide a physical location of media player 108-*x*; commands to adjust an audio output (e.g., turn off, mute, fade in, or fade out the audio output, restore a previous volume of the audio output before the volume has been changed, etc.); commands to adjust video outputs (e.g., black out, dim or brighten a video output, restore a previous brightness level of the video output, etc.); commands to buffer/store audio/video output; commands to play the buffered audio/video; commands to store information that indicates what portion of content of the audio/video output has been played (e.g., particular scene or freeze-frame); commands to play the un-played portion of the content of the audio/video output; etc. In different implementations, local network logic 408 may respond to additional or different network requests or commands, based on the particular network and media devices 108.

Figure 5:
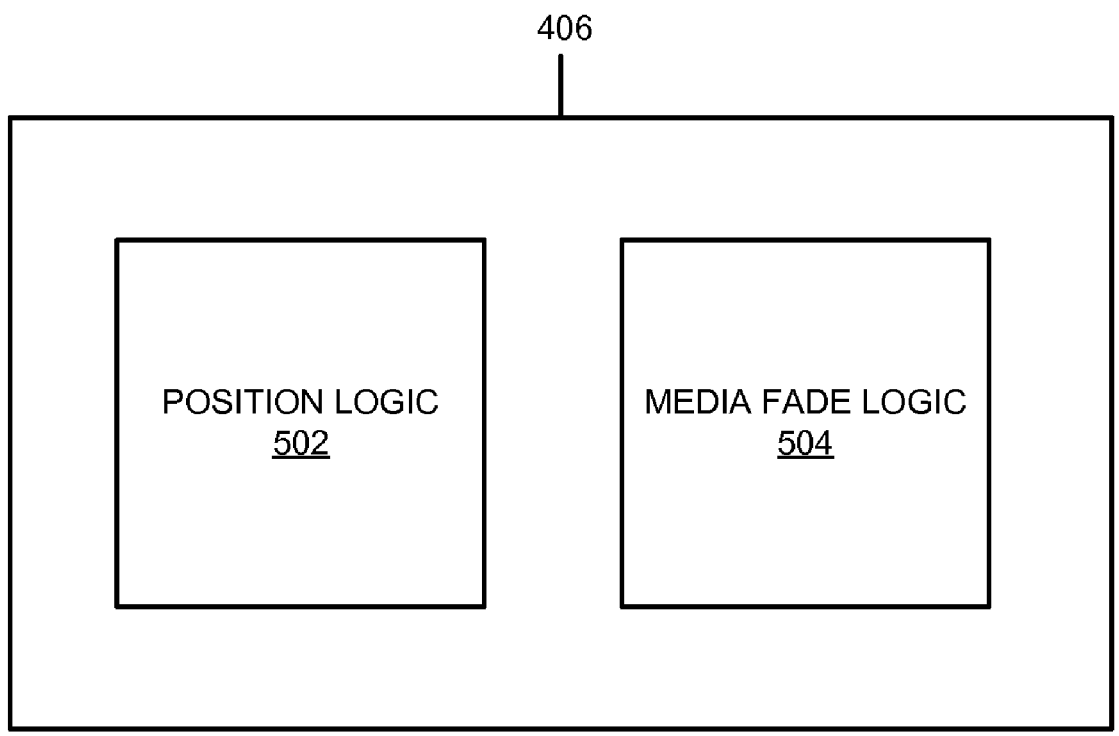
FIG. 5 is a functional block diagram of intelligent media control (IMC) logic of FIG. 4.

FIG. 5 is a block diagram of exemplary IMC logic 406. As shown, IMC logic may 406 include position logic 502 and media fade logic 504. Depending on the implementation, IMC logic 406 may include additional, fewer, or different components than those illustrated in FIG. 5. For example, in one implementation, IMC logic 406 may include logic for controlling a television (e.g., adjusting volume, turning off the television, changing channel, etc.) that is connected to local media network 102.

Position logic 502 may determine physical locations of different devices in local media network 102. For example, position logic 502 may include host position logic for determining the physical location of network device 300 that hosts IMC logic 406 and network device position logic for determining physical locations of media devices 108 in local media network 102, The host position logic may rely on one or more mechanisms to determine the physical location of network device 300. For example, in one implementation, the host position logic may use a GPS receiver within network device 300 to determine its physical location. In another implementation, the host position logic may exchange messages with nearby location sensors to triangulate the physical location of network device 300. In yet another implementation, the host position logic may accept inputs from sensors in network device 300 (e.g., an accelerometer and a gyroscope) to track network device 300.

The network device position logic may determine physical locations of other devices in local media network 102 based on messages from the other devices and/or user input. In accordance with the DLNA guidelines, when network device 300 (e.g., mobile device 106) enters local media network 102, network device 300 may discover network addresses of media devices 108 in local media network 102. After the discovery of media devices 108, the network device position logic may send a request to each of media devices 108 to identify media device 108-*x*'s physical location. Media device 108-*x* may include a GPS receiver and/or location sensors that enable media device 108-*x* to determine its physical location and allow media device 108-*x* to answer the request with its location information.

Media fade logic 504 may determine distances between network device 300 and media devices 108 based on outputs from the host position logic in network device 300 and network device position logic in network device 300. Depending on the distances, media fade logic 504 may cause a set of media devices 108 to change their operating parameters. For example, when network device 300 receives a phone call and media fade logic 504 in network device 300 determines that network device 300 is physically close to media device 108-3, media fade logic 504 may send a request to media device 108-3 to turn down the volume of its audio output. Similarly, when network devices 300 terminates a call and/or media fade logic 504 determines that network device 300 has just moved out of audio range of media device 108-3, media fade logic 504 may send a request to media device 108-3 to restore the volume of its audio output prior to the call.

In the example, media fade logic 504 may be capable of issuing one or more of commands that pertain to turning on/off (e.g., black out a video output, mute an audio output, etc.) or turning down (e.g., fading out, fading in) audio/video output of media devices 108, restoring the audio/video output of media devices 108, buffering a audio/video output of media devices 108, playing the buffered audio/video output, storing information that indicates what part of content in the audio/video output has been played when the phone call is received, and playing the un-played portion of the content, etc. In such an implementation, the user may configure one or more of such commands to be issued by mobile device 106, via the user interface on mobile device 106, depending on the relative locations of network device 300 (e.g., mobile device 106) and media devices 108. Furthermore, via the user interface, the user may be able to modify different parameters that pertain to the commands, such as the rate of a fade out/fade in.

Exemplary Process for Intelligent Interaction Between Devices

Figure 6:
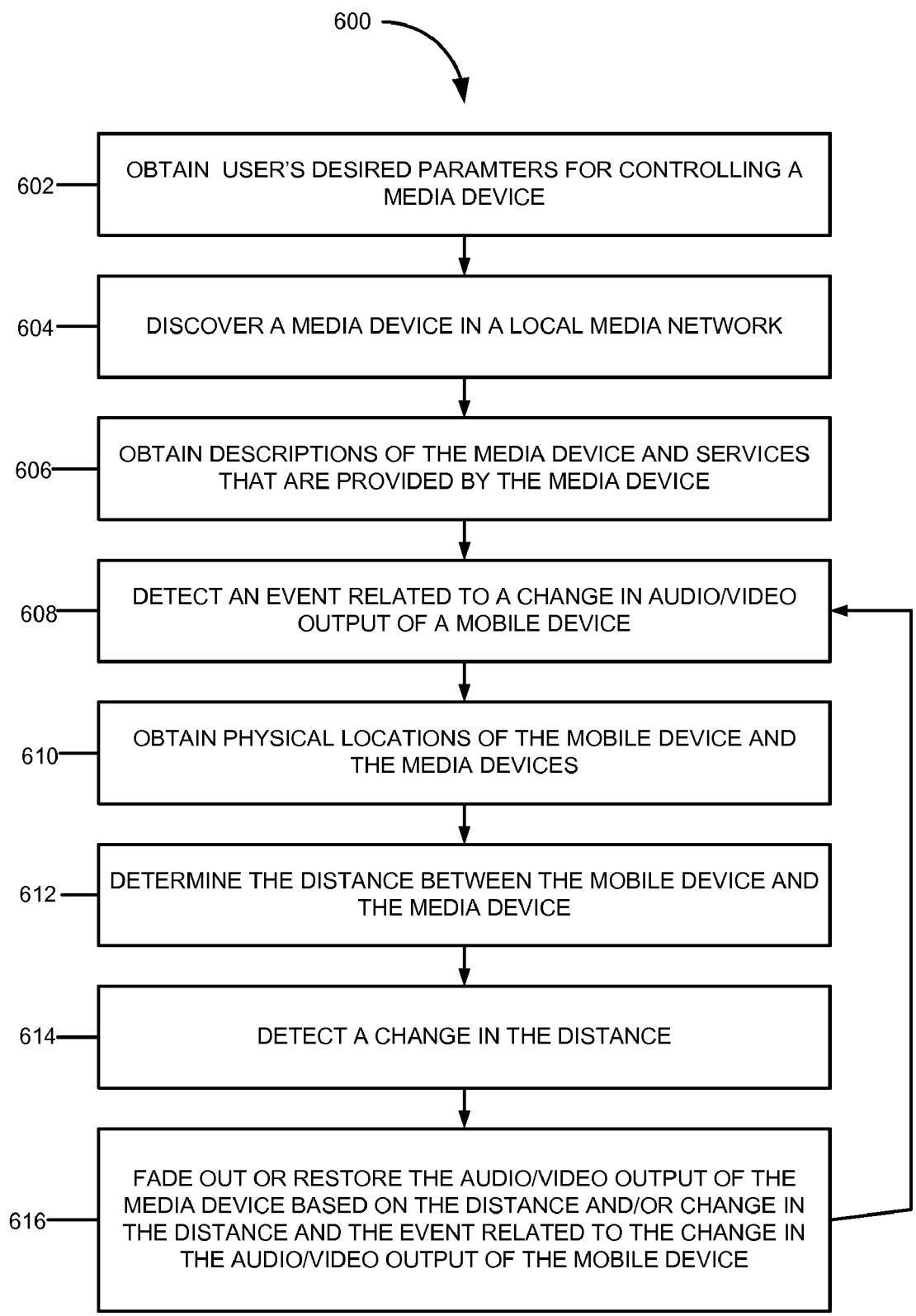
FIG. 6 is flow diagram of an exemplary process for intelligent interaction between devices in a local media network.

FIG. 6 illustrates an exemplary process 600 that is capable of being performed by one or more of the devices and/or components described above. Process 600 may begin at block 602, where user's desired parameters for controlling media device 108-*x* may be obtained (block 602). In one implementation, media fade logic 504 in mobile device 106 may provide a user interface via which a user may input the desired parameters. The parameters may include, for example, a desired level of volume/brightness of a audio/video output of media device 108-*x* when mobile device 106 that is generating and/or receiving audio/video input/output moves into or is within a particular range from media device 108-*x*; the range within which mobile device 106 may cause the volume/brightness of the audio/video output of media device 108-*x* to be reduced or fade out to a desired level; a rate at which the volume/brightness is to be reduced, fade, or restored; etc. If the user does not provide input, mobile device 106 may use default values.

In some implementations, the user may be able to select/configure, via the user interface, which commands (e.g., turn off audio/video output, fade in/fade out, etc.) mobile device 106 may issue to media device 108-*x*, depending on the relative locations and/or the audio output of mobile device 106 and media devices 108.

Mobile device 106 may discover media device 108-*x* in local media network 102 (block 604). Mobile device 106 may discover media device 108-*x* when mobile device 106 enters local media network 102, by either physically becoming attached to local media network 102 or by entering a region in which mobile device 106 may establish a wireless communication link with a wireless access point (WAP) for local media network 102. Mobile device 106 may enter the region by physically being carried into the region while mobile device 106 is powered on, or, alternatively, by being turned on when mobile device 106 is within the region.

In some implementations, mobile device 106 may discover media device 108-*x* in accordance with a network communication protocol. For example, mobile device 106 may discover media device 108-*x* in accordance with UPnP specifications that are part of the DLNA guidelines/protocols.

In such implementations, local network logic 408 in mobile device 106 may advertise or broadcast mobile device 106's presence to media devices 108 in local media network 102, and obtain responses to the advertisements/broadcasts from one or more media devices 108. The responses may include identification information, such as a universally unique identifier (UUID), a Uniform Resource Locator (URL), or more detailed information, etc.

Mobile device 106 may obtain descriptions of media device 108-*x* and services that are provided by media device 108-*x* (block 606). Upon receiving the UUID and/or the URL as described above, mobile device 106 may access the URL to obtain an extensible markup language (XML) description of media device 108-*x* and services that are provided by media device 108-*x*. For example, the description of media device 108-3 may indicate that media device 108-3 corresponds to stereo speakers.

In one implementation, the services may include responding to requests that are described above in connection with local network logic 408 (e.g., a command to fade out the volume of an audio output of media device 108-*x*; a command to fade in the volume of the audio output; a command to restore a previous volume of the audio output before the volume has been changed; a command to pause video/audio output; a command to resume the video/audio output; a command to buffer the audio/video output; a command to play the buffered audio/video output; a command to store information that indicates what part of content in the audio/video output has been played when the phone call is received; and a command to play the un-played portion of the content.

As described above, the requests may be issued in accordance with SOAP or a protocol compatible with mobile device 106 and media devices 108.

Mobile device 106 may detect an event related to a change in audio/video output of mobile device 106 (block 608). For example, mobile device 106 may detect an incoming phone call, which initiates the audio/video output of mobile device 106, or the end of a call, which terminates the audio/video output. In another example, mobile device 106 may detect when an audio file is being played (e.g., playing a sound clip, a song, etc.).

Media fade logic 504 may obtain physical locations of host mobile device 106 and media device 108-*x* (block 610). Media fade logic 504 may obtain the physical location of mobile device 106 from position logic 502 in mobile device 106. In addition, media fade logic 504 may obtain the physical location of media device 108-*x* from position logic 502 in media device 108-*x* via a communication link.

At block 612, media fade logic 504 may determine the distance between host mobile device 106 and media device 108-*x* (block 612). At block 614, media fade logic 504 may detect a change in the distance between mobile device 106 and media device 108-*x* (block 614).

Media fade logic 504 may cause media device 108-*x* to fade out or restore the audio/video output of media device 108-*x* based on the distance and/or the change in distance and the event related to the change in audio/video output of mobile device (block 616).

Figure 7:
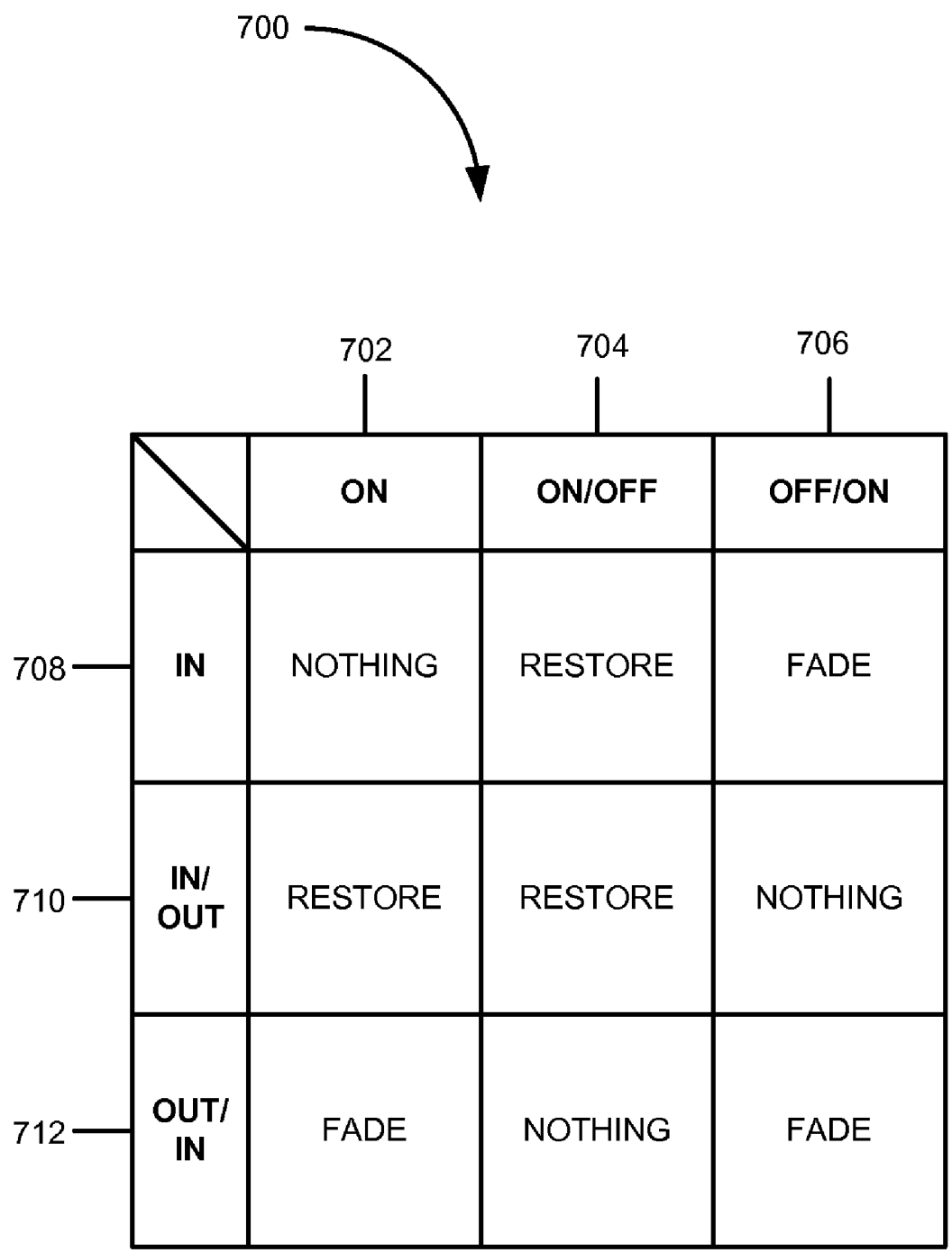
FIG. 7 shows a table of actions that a device may perform in different device states.

FIG. 7 illustrates a table 700 of actions that media fade logic 504 may perform depending on the event and the distance and/or the change in distance between mobile device 106 and media device 108-x. As shown, table 700 may include columns 702-706 that represent the event related to the audio/video output of mobile device 106. Column 702 may represent the audio/video output being "on" (e.g., no event); column 704 may represent a change in the audio/video output, from being "on" to "off" (e.g., the end of a phone call); and column 706 may represent a change in the audio/video output, from being "off" to "on" (e.g., receiving an incoming call).

As further shown in FIG. 7, table 700 may include rows 708-712 that represent a distance or a change in the distance between mobile device 106 and media device 108-x. Row 708 may represent mobile device 106 staying within the range (obtained at block 602) of media device 108-x. Row 710 may represent mobile device 106 moving from within the range to outside the range of media device 108-x. Row 712 may represent mobile device 106 moving from outside the range to within the range of media device 108-x.

Table 700 may summarize actions/commands that mobile device 106 may perform/issue to media devices 108 when mobile device 106 moves in or of the range of media device 108-x, when the audio/video output of mobile device 106 turns on or off, or when the audio/video output remains turned on and mobile device 106 remains within the range. To illustrate, assume that mobile device moves from an area outside the range to within the range of media device 108-x (e.g., row 712 of table 700), and that mobile device 106 receives a call when mobile device 106 is within the range (e.g., column 706 of table 700). At row 712 and column 706, table 700 may include an instruction or command of FADE, indicating that mobile device 106 may cause media device 108-x to fade out/reduce/turn off the audio/video output of media device 108-x. Fading out the audio or video output of media device 108-x may prevent media device 108-x from interfering with the audio output of mobile device 106, or prevent the sound from media device 108-x from making it difficult for the user of mobile device 106 from communicating with another party.

In another example, assume that mobile device 106 stays within the range of media device 108-x (e.g., row 708 of table 700), and that the audio/video output stays on (e.g., column 702). At row 708 and column 702, table 700 may include an instruction/command of NOTHING, indicating that mobile device 700 may not cause media device 108-x to modify the audio/video output of media device 108-x. Because mobile device 106 has not moved out of the range or changed its audio/video output, media device 108-x's volume, which may already be faded, may not change.

In yet another example, assume that mobile device is initially inside the range of media device 108-x and moves out of the range (e.g., OUT row 710). In addition, assume that, mobile device 106 is engaged in a call while mobile device 106 moves from inside the range to outside the range (e.g., column 702). At row 710 and column 702, table 700 may include an instruction/command to RESTORE, indicating that mobile device 106 may restore a level of audio/video output prior to mobile device 106's arrival inside the range.

When mobile device 106 fades out audio/video output of media device 108-x, mobile device 106 may store the level of audio/video output prior to the fade out. Thus, in restoring the audio/video output of media device 108-x, mobile device 106 may use the stored value of the audio/video output and signal media device 108-x to restore the audio output level to the previous level. If there is no stored value of the level (e.g., media device 108-x is turned off when a phone call is received), mobile device 106 may not restore or change the audio/video output of media device 108-x. Alternatively, media device 108-x may store the previous level and return media device 108-x to the previous level in response to a command or signal from mobile device 106.

In some implementations, when mobile device 106 detects an event related to audio/video output of mobile device 106 and/or a change in the distance between mobile device 106 and media device 108-x, mobile device 106 may cause (e.g., by sending a command) media device 108-x to perform actions other than those related to increasing/decreasing volume of an audio output, brightness of video output, etc. For example, in one implementation, mobile device 106 may cause media device 108-x to pause/resume outputting audio/video when an audio/video event associated with mobile device 106 occurs. In another implementation, mobile device 106 may cause media device 108-x to buffer a video/audio output from a source (e.g., from an Internet content provider) and/or to resume playing the buffered video/audio output when an audio/video event associated with mobile device 106 occurs.

In yet another implementation, mobile device 106 may cause media device 108-x to store information that indicates what part of content in the audio/video output has been played and/or to play the un-played part of the content when the video/audio event associated with mobile device 106 occurs. For example, assume that three people are watching a DVD, and one of them receives a call on a mobile device. In such a case, the people may not want to pause playing the DVD when the call starts or ends. Instead, information about what part of the DVD has been played may be stored, so that the person who receives the call may later watch the un-played portion of the DVD.

Process 600 may return to block 604 and/or 608 to continue to detect media devices 108 and/or an event related to a change in the audio/video output of mobile device 106.

Example

Figure 8:
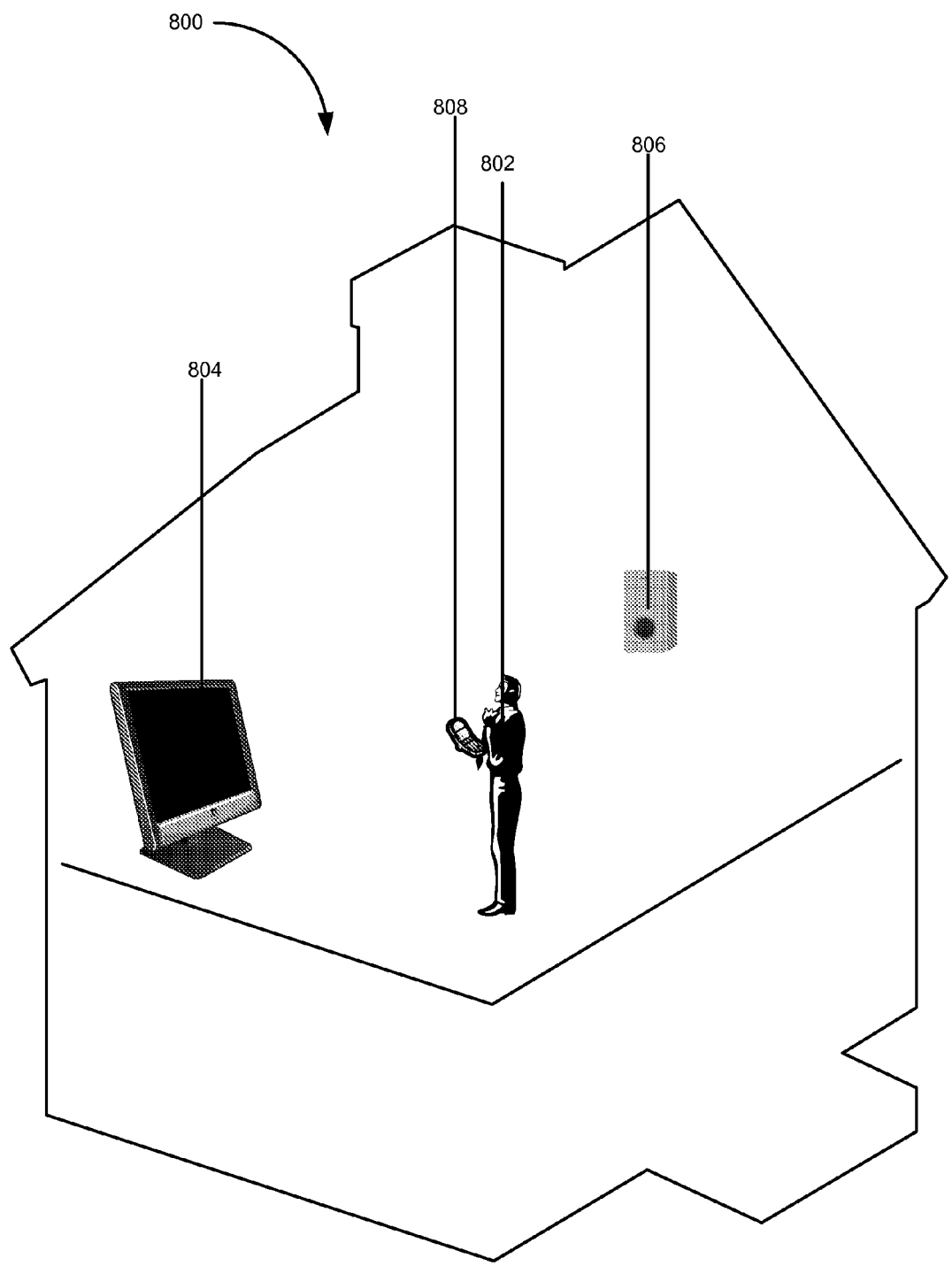
FIG. 8 illustrates an exemplary environment in which the concepts described herein may be implemented.

The following example, with reference to FIG. 8, illustrates above described process 600 in which a device interacts intelligently with other devices in local media network 102.

FIG. 8 illustrates an exemplary environment in which the concepts described herein may be implemented. Assume that user 802 (e.g., Max) has connected a digital television 804 and speaker 806 to a local media network (not shown) in his house. In addition, assume that digital television 804, speaker 806, and cell phone 808 are compliant with the DLNA guidelines and UPnP protocol. Furthermore assume that digital television 804, speaker 806, and cell phone 808 provide services in which they respond to requests from other devices in the local media network to provide their physical locations and to change volumes of their audio output. Further, assume that for each of digital television 804, speaker 806, and cell phone 808, the position or location services are published in an XML document at a URL that are exchanged between devices in the local media network.

Max inputs into cell phone 808 a level of volume of sound he expects from a media player when Max receives or places a call on cell phone 808 and a particular range between cell phone 808 and digital television 804 and/or speaker 806 (e.g., 20 feet). When Max arrives at his house, cell phone 808 initiates a discovery of media devices on the local media network. Cell phone 808 discovers television 804 and speaker 806 on the local media network. From URLs that cell phone 808 obtains from digital television 804 and speaker 806, cell phone 708 obtains device and service descriptions of digital television 804 and speaker 806.

Max leaves his cell phone 808 powered on while he watches digital television 804. When cell phone 808 detects an incoming call, cell phone 808 obtains the physical locations of cell phone 808, digital television 804, and speakers 806. In addition, cell phone 808 determines a distance between cell phone 808 and digital television 804 and a distance between cell phone 808 and speaker 806.

After determining that cell phone 808 is within the particular range of digital television 804 (e.g., 20 feet in this example), cell phone 804 exchanges one or more messages with digital television 804 over the local media network to fade out the sound of digital television 804. When Max moves away from digital television 804 (e.g., outside the preset range of 20 feet) and toward speaker 806, cell phone 808 detects the movement of cell phone 808 and restores the volume of sound on digital television 804. If cell phone 808 is within the preset range of speaker 806, cell phone 808 reduces the volume of sound from speaker 806.

Cell phone 808 continues to change audio outputs of digital television 804 and speaker 806, as Max 802 roams inside his house and converses with the caller.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, in one implementation, mobile device 106 may be able to detect the level of ambient noise and use the detected noise level to adjust the audio/video output of media devices 108. In another implementation, mobile device 106 may issue commands for transferring (e.g., blending in or blending out) the audio/video output to/from mobile device 106 from/to media device 108-x (e.g., a television with speakers, an entertainment center with a microphone, a laptop computer with speakers and a display, etc.). Some of such commands may pertain to a telephone call, as described above, and other commands may pertain to different types of audio/video output, such as playing a song or a movie, displaying text, etc.

In another example, while a series of blocks has been described with regard to an exemplary process illustrated in FIG. 6, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   detecting, by one or more processors of a mobile device, a change in video or audio output of the mobile device,
   wherein detecting the change in the video or audio output of the mobile device includes:
   detecting a playing of an audio file or a video file;
   obtaining, by the one or more processors, a physical location of the mobile device and a physical location of a media device in response to the detecting of the playing of the audio file or the video file;
   determining, by the one or more processors, a distance between the mobile device and the media device based on the physical locations of the mobile device and the media device;
   determining, by the one or more processors, whether the distance is within a predetermined range; and
   modifying, by the one or more processors, output of the media device when the distance is within the predetermined range,
   wherein modifying the output of the media device includes:
   sending a command from the mobile device to the media device to store information that indicates that a particular portion of the content has been played.

2. The method of claim 1, where modifying the output of the media device further includes at least one of:
   sending a command from the mobile device to the media device to fade out or reduce an audio output of the media device;
   sending a command from the mobile device to the media device to pause the output of the media device; or
   sending a command from the mobile device to the media device to buffer the output of the media device.

3. The method of claim 1, where sending the command to the media device includes:
   sending a Simple Object Access Protocol command.

4. The method of claim 1, wherein the stored information identifies a particular scene in the played portion of the content, the method further comprising:
   detecting a change in the distance between the mobile device and the media device;
   determining whether the mobile device is within the predetermined range of the media device; and modifying the output of the media device when the mobile device is not within the predetermined range,
wherein modifying the output of the media device when the mobile device is determined not to be within the predetermined range includes:
causing the media device to play an un-played portion of the content at a point in the content, in the output of the media device, after the particular scene that has been played.

5. The method of claim 1, where detecting the change in video or audio output of a mobile device includes one of:
detecting an incoming phone call;
detecting a termination of a call; or
detecting a playing of an audio disk or a video disk.

6. The method of claim 1, further comprising:
discovering the media device in a local media network in accordance with Universal Plug and Play protocol.

7. The method of claim 1, further comprising:
obtaining a service description and a device description of the media device via a local media network.

8. The method of claim 1, where obtaining the physical location of the mobile device and the physical location of the media device includes:
requesting the media device to provide the physical location of the media device.

9. The method of claim 2, wherein modifying the output further includes at least one of:
restoring an audio output of the media device to a volume level set prior to the detected change in the output of the mobile device;
causing the media device to resume the output of the media device;
causing the media device to play the buffered output of the media device; or
causing the media device to play an un-played portion of the content based on the stored information that indicates the portion of the content, in the output of the media device, that has been played.

10. The method of claim 1, further comprising:
receiving, from a user a desired level of volume to which the output of the media device is to be set when a change is detected in the audio output of the mobile device.

11. The method of claim 1, further comprising:
exchanging multimedia content with the media device in accordance with Digital Living Network Alliance protocols.

12. A device comprising:
a network interface through which the device communicates with a media device in a local network; and
a processor to:
receive user input indicating a predetermined range between the media device and the device,
detect whether the device receives a call,
determine whether the device is within the predetermined range of the media device based on communication between the device and the media device, and
send a message to the media device via the network interface to request the media device to modify an output of the media device when the device is within the predetermined range of the media device and when the device has received the call,
wherein, when sending the message, the processor is to:
send a command to the media device to, without pausing playing of content in the output of the media device, store information that indicates a portion of the content that has been played.

13. The device of claim 12, where the device includes:
a universal plug and play (UPnP) compliant device.

14. The device of claim 12, where the local network includes:
a network that is compliant with Digital Living Network Alliance guidelines.

15. The device of claim 12, where the media device includes one of:
a speaker; a television; a personal computer; a laptop; a receiver; a digital video disk player; or a game playing device.

16. The device of claim 12, where the processor is further to:
detect the media device via a discovery protocol.

17. The device of claim 12, where the message includes:
a Simple Object Access Protocol message.

18. The device of claim 12, further comprising at least one of:
an accelerometer for determining a position of the device;
a Global Positioning System receiver for determining a location of the device;
a Cell positioning system (CPS) receiver for determining a location of the device;
a Global Navigation Satellite System (GLONASS) receiver for determining a location of the device; or
a Beidou Navigation system receiver for determining a location of the device.

19. The device of claim 12, where the processor is further to:
receive user input for setting a desired level of volume for reducing the output of the media device when the media device is within the predetermined range.

20. A device comprising:
means for detecting whether the device receives a call;
means for discovering a media device in a local media network based on the detecting;
means for sending a request for a physical location of the media device to the media device;
means for determining whether the device is within a predetermined range of the media device based on a response from the media device;
means for sending a first request to the media device to store information indicating that a particular scene has been played in an output of the media device, when the device moves into the predetermined range of the media device during the call;
means for determining that the call has ended; and
means for sending, when the call has ended, a second request to the media device to identify the particular scene.

* * * * *